United States Patent [19]

Gust et al.

[11] 3,981,414
[45] Sept. 21, 1976

[54] BEVERAGE DISPENSING SYSTEM

[76] Inventors: Raymond Edward Gust, 10327 Strawberry Lane, Spring Valley, Calif. 92077; Patrick Henry Murphy, 1464 Bridge Street, Clarkson, Wash. 99403

[22] Filed: Apr. 7, 1975

[21] Appl. No.: 565,435

[52] U.S. Cl. ................................. 222/38; 222/66; 222/334
[51] Int. Cl.[2] ..................... B67D 5/22; G01F 11/06
[58] Field of Search ............. 222/36, 38, 66, 129.3, 222/129.4, 309, 373, 334, 389

[56] References Cited
UNITED STATES PATENTS

| | | | |
|---|---|---|---|
| 2,865,468 | 12/1958 | Kupka et al. | 222/389 X |
| 2,954,146 | 9/1960 | Hullman | 222/66 X |
| 3,149,753 | 9/1964 | Forsyth | 222/66 X |
| 3,598,287 | 8/1971 | deMan | 222/334 X |
| 3,830,405 | 8/1974 | Jaeger | 222/129.3 |
| 3,853,245 | 12/1974 | Branch et al. | 222/373 X |

*Primary Examiner*—Robert B. Reeves
*Assistant Examiner*—Francis J. Bartuska
*Attorney, Agent, or Firm*—Brown & Martin

[57] ABSTRACT

A beverage dispensing system which will deliver a precise, pre-set quantity of a selected beverage at each actuation. The system is operated by low pressure gas from a quickly replaceable source, and utilizes a controlled stroke piston pump which is driven and returned by the pressurized gas. All the valves for automatic operation of the pump are contained in the compact pump housing, but the gas and liquid sections are completely isolated to avoid contamination. The pump and valve unit contains a minimum of parts, all of which are readily accessible for cleaning and servicing. An automatic count of operations is maintained and the system shuts off when the liquid level is too low for a full serving.

9 Claims, 13 Drawing Figures

BEVERAGE DISPENSING SYSTEM

BACKGROUND OF THE INVENTION

Various systems have been developed for dispensing measured quantities of liquids by many different means. The most precise types use a positive displacement pump, usually with a controlled stroke piston, to fill and empty a container of the required volume with each stroke. The piston can be driven by mechanical means, such as a crank drive or similar reciprocating device, or by compressed air or the like. With mechanical drives the apparatus is bulky, complex and requires considerable maintenance. In apparatus operated by high pressure means, it is difficult to control leakage and avoid contamination of the liquid by propellant gas. Some systems dispense several liquids selectively through a common outlet, in order to reduce the bulk of the apparatus and permit the use of common drive means. Contamination is again a problem and breakdown of one component may require shut down and servicing of the entire system.

SUMMARY OF THE INVENTION

The apparatus described herein is so simple and compact that a separate system may be used for each beverage to be dispensed. The system uses a positive displacement piston pump driven by low pressure gas, such as Freon, from an easily replaceable pressurized can. A push button, or similar means, initiates an operating cycle to draw liquid from a reservoir into a pump chamber and then dispense the liquid through a suitable outlet. The volume delivered is controlled by an adjustment in the stroke of the piston, which is driven and returned by the low pressure gas. Once a cycle is started the push button is inoperative until the cycle is completed.

All valves for the propellant gas and for the liquid are contained in the compact pump body and are readily accessible for servicing. The operations are automatically counted and the system shuts off if the liquid level is too low to ensure a full volume delivery, the liquid path being kept full at shut off so that there is no break in correct volume of each delivery when the reservoir is replenished.

The primary object of this invention, therefore, is to provide a new and improved beverage dispensing system.

Another object of this invention is to provide a beverage dispensing system by which a precise quantity of a beverage is delivered by low pressure gas actuated means.

Another object of this invention is to provide a beverage dispensing system wherein the pump and all associated valves are contained in a single compact unit, with the propulsion gas and beverage sections separated.

A further object of this invention is to provide a beverage dispensing system having means for preventing delivery of a short measure.

Other objects and advantages will be apparent in the following detailed description, taken in conjunction with the accompanying drawings, in which.

DESCRIPTION OF THE PREFERRED EMBODIMENT

Figure 1:
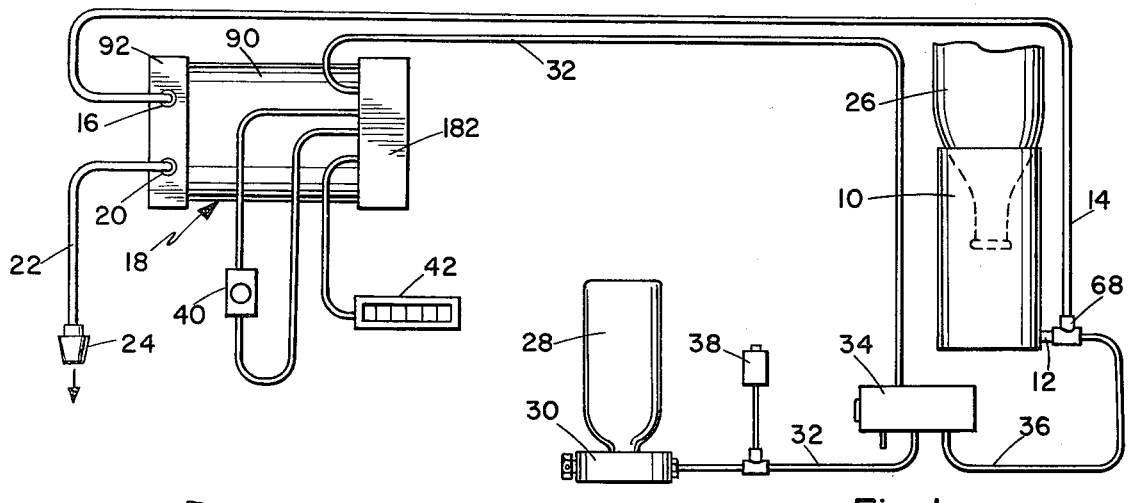
FIG. 1 illustrates the complete system in diagrammatic form.

The system as illustrated in FIG. 1 includes a beverage reservoir 10 having a supply outlet 12, from which a supply hose 14 leads to the inlet 16 of a pump unit 18. The pump unit has an outlet 20 with a delivery hose 22 leading to a nozzle 24, from which the beverage is dispensed. The beverage may be supplied directly from a bottle 26 inverted in the reservoir 10.

Pump unit 18 is actuated by low pressure gas from a source such as a pressurized cartridge 28, removably held in an adapter 30. The pressure line 32 from the adapter leads to the pump unit 18 through a shut off valve 34, which is controlled by a low liquid level sensing means, hereinafter described in detail, through a bleed line 36 from the supply outlet 12. A pressure indicator 38 of any suitable type is installed in the pressure line 32 to indicate low pressure in cartridge 28, so that it may be replaced when necessary. An actuating switch 40 is connected to the pump unit 18 to start a delivery cycle and a counter 42 keeps count of the cycles.

Figure 2:
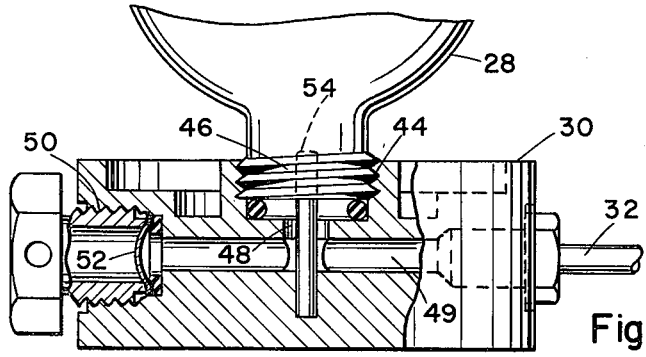
FIG. 2 is an enlarged view, partially cut away, of the replaceable pressurized gas source and adapter.

Adapter 30, illustrated in FIG. 2, is a block member having a threaded bore 44 to receive the threaded neck 46 of cartridge 28. A port 48 opens from bore 44 into a transverse channel 49, the pressure line 32 being secured in one end of the channel. At the other end of channel 49 is a pressure relief valve 50 with a brust diaphragm 52, or similar means, to prevent damage to the system from excess pressure. A puncture pin 54, seated in the adapter, extends through port 48 to open the valve of the cartridge 28 as it is inserted, the arrangement being well known.

Figure 3:
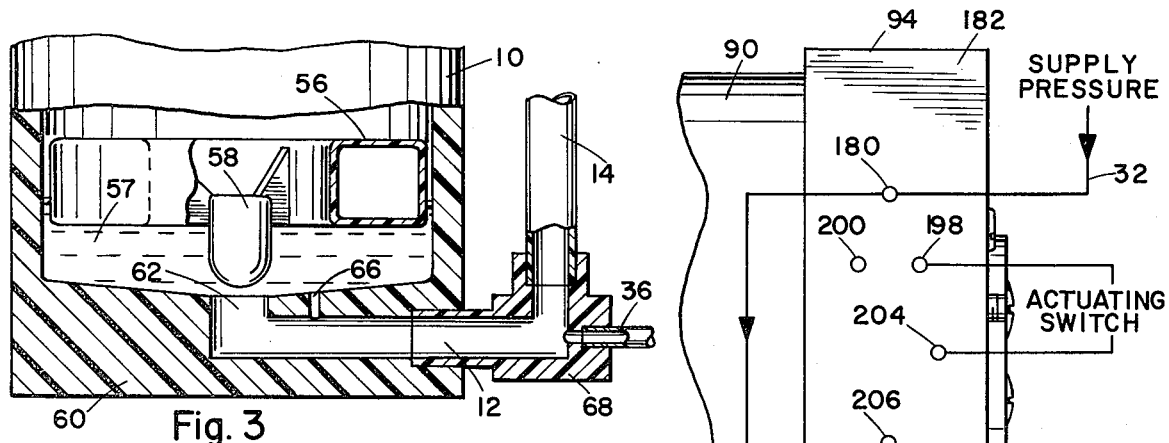
FIG. 3 is an enlarged view, partially cut away, of the liquid reservoir and level sensing valve.
Figure 4:
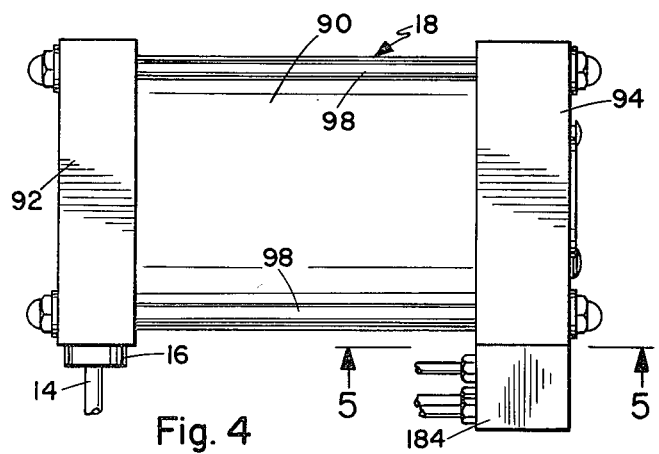
FIG. 4 is an enlarged top plan view of the pump unit of FIG. 1.

Reservoir 10 is a cylindrical container, the upper end of which will hold most standard sized beverage bottles in inverted position. The lower end of the reservoir, illustrated in FIG. 3, contains a float 56 which floats on the liquid 57, and has a valve plug 58 extending below the float. The closed lower end 60 of reservoir 10 has a sump opening 62, from which a channel 64 leads to outlet 12. When the liquid falls below a predetermined level, valve plug 58 enters opening 62 and shuts off the liquid supply. However, a small bleed port 66 extends from the interior of the reservoir into channel 64 to allow a slow leak of liquid, the purpose of which is hereinafter described. Outlet 12 has a Tee connection 68, to which supply hose 14 is connected. Also connected to channel 64 through Tee connection 68 is the bleed line 36, which provides for operation of shut off valve 34.

Figure 13:
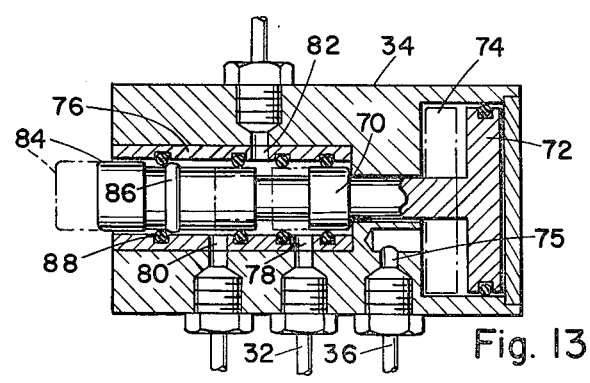
FIG. 13 is a longitudinal sectional view of the cut off valve of FIG. 1.

The shut off valve 34, illustrated in section in FIG. 13, contains an axially slidable valve spool 70, on one end of which is a piston 72 sliding in a cylinder 74. Bleed line 36 is connected to a vacuum port 75 communicating with cylinder 74. Valve spool 70 slides in a sleeve 76 which has an inlet port 78 and an axially spaced vent port 80 on one side, and an outlet port 82 on the other side. Pressure line 32 is connected across the shut off valve between inlet and outlet ports 78 and 82. The valve structure is conventional and may vary from the arrangement shown.

On the end of the valve spool opposite piston 72 is a reset button 84, which projects from the end of the valve. In the ON position, shown in full line, the reset button 84 is retracted, piston 72 is at the outer end of cylinder 74, and inlet port 78 is connected across the spool to outlet port 82. When a vacuum is applied through bleed line 36, the vacuum pulls piston 72 to the left, sliding the valve spool 70 and closing inlet port 78, while at the same time connecting outlet port 82 to the vent port 80. Pressure to the pump unit 18 is thus shut off and reset button 84 is extended, as in the broken line position, to indicate an OFF condition of the valve.

The shut off action is caused by low liquid level in reservoir 10, when valve plug 58 closes socket 62 while the pump is drawing liquid. The shut off of liquid causes the pump to empty channel 64 and draw a partial vacuum in bleed line 36, which actuates the shut off valve 34 and stops the pump. The cavitation is only momentary, because liquid leaks slowly through the bleed port 66 to refill channel 64. Thus the supply hose 14 remains filled with liquid while the pump is off, so that successive delivery cycles always supply a full measure of liquid. The system is reactivated by replenishing the liquid supply in reservoir 10 and depressing reset button 84 to open the shut off valve. For convenience, valve spool 70 has an annular bead 86 which rides over an O-ring 88 inset in sleeve 76, to provide a snap action for the reset button 84. The button may be distinctively colored or illuminated in a suitable manner to indicate low liquid level.

Figure 12:
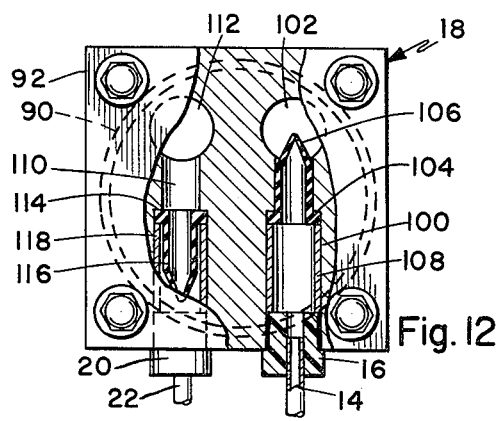
FIG. 12 is an end view of the pump unit, partially cut away, as taken from the right hand end of FIG. 4.

Pump unit 18 comprises a cylindrical body in the form of a cylinder 90 of glass, plastic, or the like, held between end blocks 92 and 94. The cylinder is seated agains O-rings 96 in the end blocks and the assembly is secured by bolts 98 between the blocks. End block 92 contains the inlet 16 and outlet 20, through which the liquid passes. As illustrated in FIG. 12, inlet 16 includes a socket 100 leading to an inlet port 102 which opens into cylinder 90. Socket 100 has a shoulder 104 on which an inlet valve element 106 is held by a retaining sleeve 108. Outlet 20 has a similar socket 110 with an outlet port 112 opening from cylinder 90. Socket 110 has a shoulder 114 on which an outlet valve element 116 is held by a retaining sleeve 118. The valve elements are illustrated as being rubber duckbill types, but could be any suitable types which open and close under low pressure.

End block 94 has an integral barrel 120 extending coaxially into cylinder 90. Slidably mounted in cylinder 90 is a hollow piston 122 which telescopes over barrel 120 and has a closed end 124 and an open end 125. An O-ring 126 seals the piston to the cylinder. On the end of barrel 120 remote from the end block is an end ring 128, having an external O-ring 130 which seals against the inside of piston 122. Secured in the open end 125 of the piston is a sealing ring 132, with an internal O-ring 134 which seals against barrel 120. The piston is circumferentially spaced from barrel 120 and the space between end ring 138 and axially spaced sealing ring 132 forms an annular cushion chamber 136. Piston 122 also has an axial boss 138 which fits loosely into an axial bore 139 in barrel 120. Threaded into boss 138 through closed end 124 is a stop screw 140, which strikes the end block 92 when the piston is extended, and is adjustable to control the stroke of the piston. End block 92 has an access bore 142 for adjustment of the stop screw 140, the access bore being sealed by a closure plug 144.

Inset in end block 94 is a valve body 146 coaxial and communicating with bore 139. The valve body has an external flange 148 which seats against the outer face of end block 94 and is secured by retaining screws 150. Axially slidable in valve body 146 is a spool 152 having a pair of axially spaced channels 154 and 156. The end of the spool 152 adjacent bore 139 has an enlarged head 158 and a central bore 160 extends through the spool. In the end of central bore 160 adjacent the outer end of the valve body is a metering orifice 162, preferably in a replaceable element to allow adjustment of bleed rate. Valve body 146 has a pair of axially spaced inlet ports 164 and 166 and a vent port 168 opening to the channels in the valve spool. Vents 170 and 172 also connect vent port 168 to the exterior of end block 94, clear of the piston.

Valve body 146 has internal bypass grooves 174 which bypass head 158 from bore 139 to the vent port 168, when spool 152 is in the starting position toward the outer end of the valve body. Also in the valve body are bypass grooves 176 which bypass the other end of the spool 152 from channel 154 to the outer end, when the spool is in the operating position toward bore 139. To provide a snap action of spool 152 in its two positions, the valve body 146 has an internal rib 175 adjacent bore 139, and head 158 has an external O-ring 177 which rides over the rib.

Barrel 120 has a longitudinal duct 178 opening to the cushion chamber 136 adjacent end ring 128, the duct being connected by a further duct 180 to one side face, the coupling face 182 of end block 94. The coupling face is where the various connections are made for the gas actuating system through a manifold 184, which is secured against the face.

Inset in the end block 94 are two control valves 186 and 188 spaced on opposite sides of the axis and adjacent coupling face 182. Control valve 186 has a cylindrical body 190 with a slidable spool 192, the spool having a plunger 194 which extends into cylinder 90 and is biased to the extended position by a spring 196. Control valve 188 is identical in construction and the parts are similarly numbered.

Figure 5:
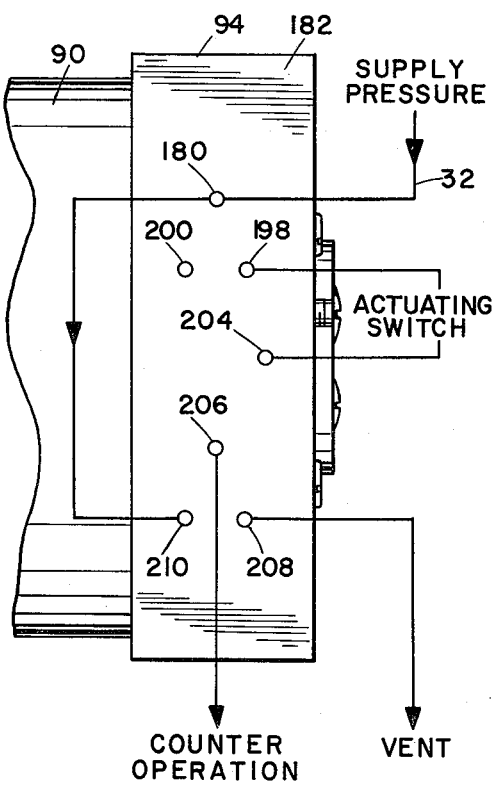
FIG. 5 is an enlarged sectional view taken on line 5—5 of FIG. 4.
Figure 6:
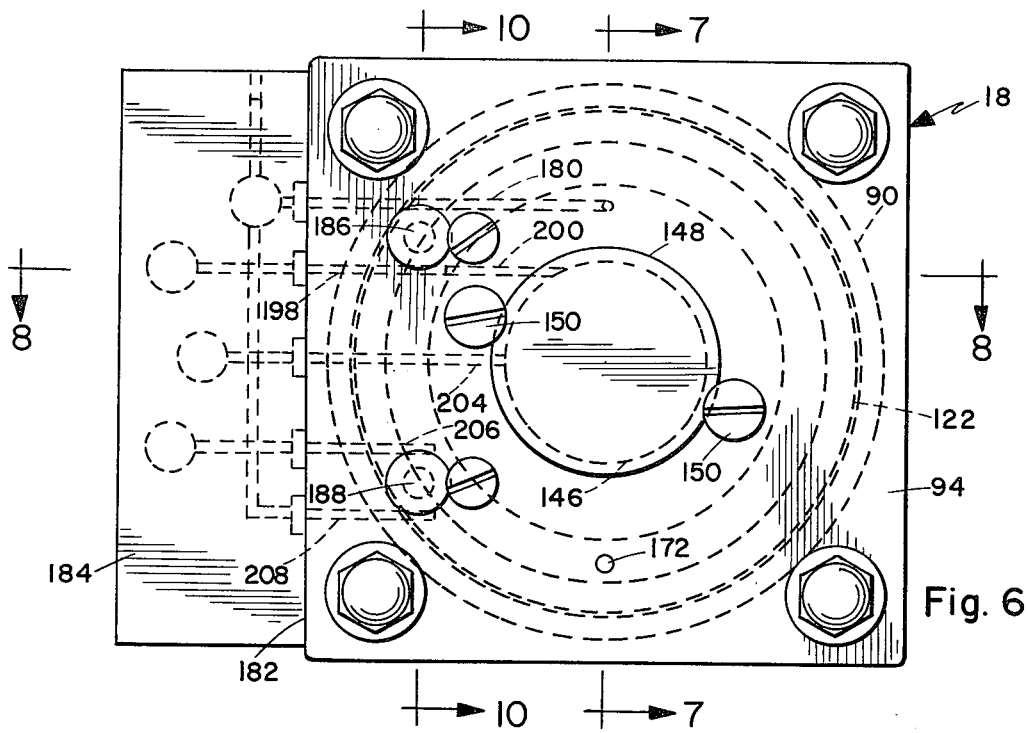
FIG. 6 is an enlarged end view of the pump unit, as taken from the right hand end in FIG. 1.
Figure 8:
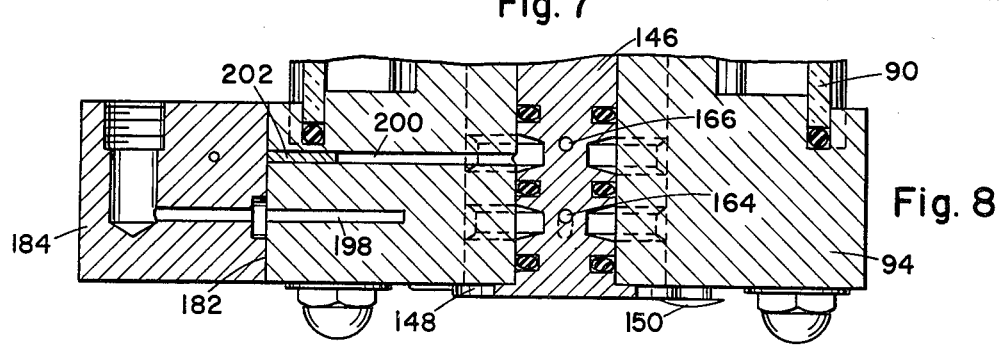
FIG. 8 is a sectional view taken on line 8—8 of FIG. 6.

Duct 180 connects to one side of control valve 186 and continues to meet duct 178. A duct 198 leads from coupling face 182 to the other side of control valve 186, and a similar duct 200 leads to the same side of the control valve and on to inlet port 166. However, as shown in FIG. 8, duct 200 is closed by a plug 202 at coupling face 182, so that only an internal connection is made between valve 186 and inlet port 166. A central duct 204 extends from the coupling face to inlet port 164 and a duct 206 extends to one side of control valve 188. Two other ducts 208 and 210 extend from the coupling face to the other side of control valve 188. Through the manifold 184, connections are made to apply supply pressure from line 32 to ducts 180 and 210. Duct 198 is coupled to duct 204 through actuating switch 40, duct 206 is connected to counter 42 and duct 208 is vented to atmosphere, as indicated in FIG. 5. Typical connections in the manifold are indicated in FIGS. 6 and 8, but may be arranged in any suitable manner for convenience.

OPERATION

Figure 7:
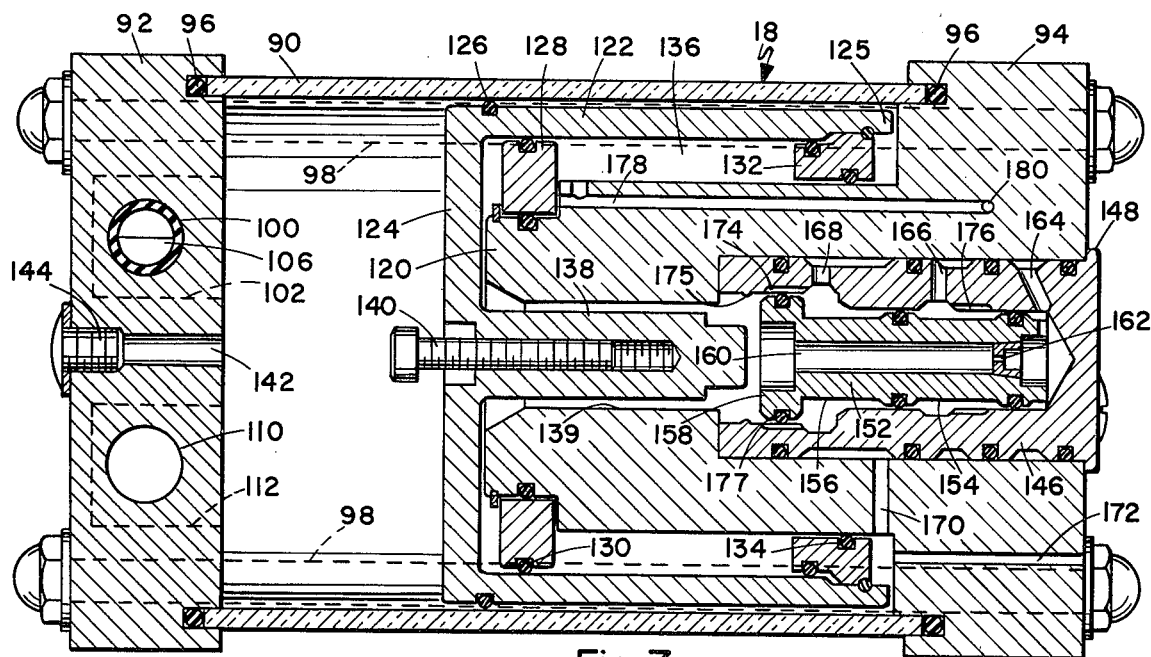
FIG. 7 is a sectional view taken on line 7—7 of FIG. 6.
Figure 10:
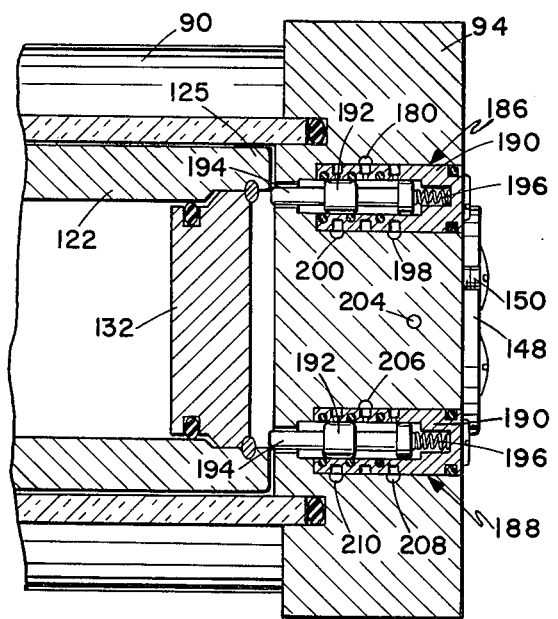
FIG. 10 is a sectional view taken on line 10—10 of FIG. 6.

In the starting position, piston 122 is retracted, as in FIGS. 7 and 10, the open end of the piston engaging plungers 194 and holding the spools 192 of control valves 186 and 188 retracted. Spool 152 is also retracted to the outer end of its valve body. With sufficient liquid in the reservoir to allow shut off valve 34 to remain open, supply pressure is applied through line 32 and ducts 180 and 178 into cushion chamber 136, holding the piston retracted. The control valve 186 is coupling the supply pressure from duct 180 to the actuating switch 40 through duct 198. Control valve 188 is closing off duct 210, so that the supply pressure there has no effect.

Figure 9:
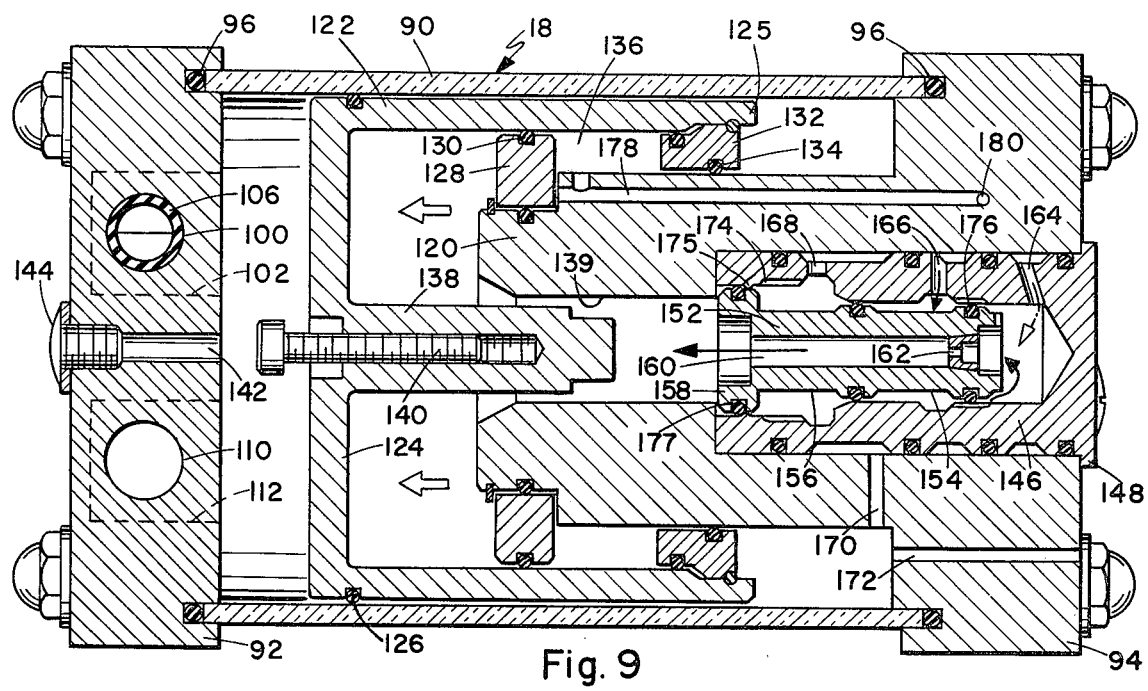
FIG. 9 is a sectional view similar to FIG. 7, but with the pump partially through a delivery stroke.
Figure 11:
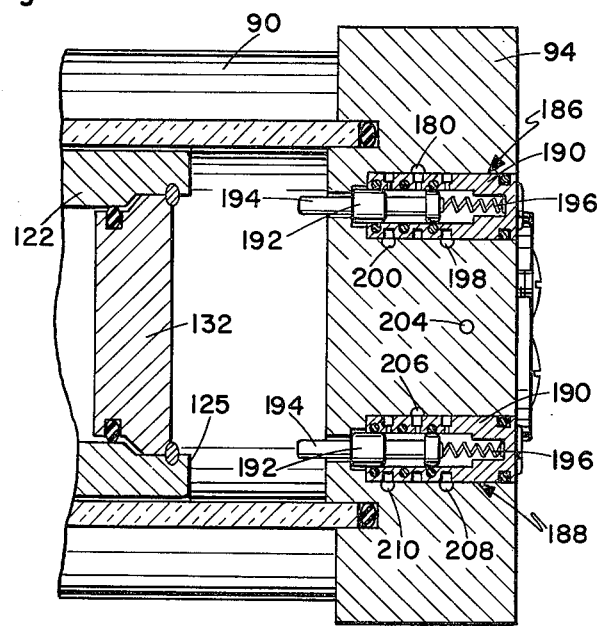
FIG. 11 is a similar sectional view but with the pump in operation, as in FIG. 9.

When actuating switch is pressed, starting pressure is applied through duct 204 to inlet port 164 and behind the spool 152, as indicated by the broken line arrow in FIG. 9. Due to the restriction of orifice 162, the initial pressure snaps the spool over rib 175 to the extended position, as in FIG. 9. The pressurized gas passes through orifice 162 at a controlled rate, through central bore 160 and bore 139 to drive the piston toward end block 92. Since the surface area of the closed end 124 is considerably more than the area of sealing ring 132, the pressure overcomes the standing pressure in cushion chamber 136. As the piston moves away from end block 94, the plungers 194 are free to move and springs 196 extend the spools 192 to operating position, as in FIG. 11. In control valve 186 this transfers the coupling of duct 180 from duct 198 to duct 200, which isolates the actuation switch 40 and prevents improper overlapping control action. Pressure through duct 200 is applied to inlet port 166 and passes through bypass grooves 176, as indicated by the full line arrow in FIG. 9, to sustain the driving force on the piston. The rate of delivery is controlled by the size of orifice 162, which can also be changed to compensate for the length of an extended liquid supply line in an installation which necessitates separation of the beverage supply from the pump.

In control valve 188, duct 210 is coupled to duct 206 and the counter 42 is actuated to record the cycle.

Piston 122 expells the liquid in the cylinder through outlet 20 and nozzle 24. When the piston reaches the end of its stroke, limited by stop screw 140, back pressure builds up inside the piston. Since the area of enlarged head 158 is greater than that of the small end of the spool 152, the back pressure snaps the spool back over rib 175 to the retracted position of FIG. 7. This opens bypass grooves 174 and allows the pressure to escape through vent port 168 and vents 170 and 172. Pressure is still being applied to cushion chamber 136 through duct 178 and this pressure, against sealing ring 132, retracts the piston. A fresh charge of liquid is drawn into the cylinder through inlet 16 as the piston retracts.

At the retraction end of the stroke, piston 122 engages plungers 194 and retracts spools 192, returning all valves to the starting position. In this last action, control valve 188 couples duct 206 to duct 208 and vents the pressure from counter 42 to complete the cycle.

Once the actuating switch is operated, the cycle is automatic and continues to completion, unless the shut-off valve stops the sequence as described above. In the pump unit, the pressurized gas and liquid circuits are isolated by multiple seals and there is no contamination problem. The propellant gas venting through vent 172 is at ambient pressure and will not break the seal of O-ring 126. The entire action is powered by the low pressure gas source, no other services or power connections being required. It has been found that Freon is a particularly suitable propellant and pressurized containers are readily available. The ease of replenishing both the liquid supply and the propellant makes the system practical for installation in many different places. All components are easily dismantled for cleaning and servicing, which is simplified by the small number of parts in the structure. The system can be packaged in a very compact unit to suit a specific installation and is completely self-contained, so that several systems can be used together for selection of multiple beverages. Malfunction of any one system does not affect the operation of the whole installation. The system is particularly suitable for use in aircraft, due to the light weight, compactness, ease of service and independence from aircraft power sources.

Having described my invention, I now claim:

1. A beverage dispensing system, comprising:
   a pump unit having a pair of end blocks with a cylinder secured therebetween;
   a piston slidable in said cylinder between a retracted position and an extended position;
   the first of said end blocks having a liquid inlet and liquid outlet therein, communicating with the interior of the cylinder;
   the second of said end blocks having a barrel extending axially into said cylinder;
   said piston being hollow with a closed end and an open end and being telescopically slidable over said barrel;
   said piston being circumferentially spaced from said barrel and slidably sealed thereto at axially spaced positions, defining a cushion chamber between the piston and barrel;
   a source of liquid beverage connected to said liquid inlet;
   a source of pressurized gas connected to said pump unit;
   valve means in said pump unit for controlling the flow of pressurized gas to drive said piston to the extended position, and for conducting gas into said cushion chamber to return the piston to the retracted position in a continuous cycle;
   and actuating means coupled to said source of pressurized gas for initiating the cycle of piston motion.

2. A beverage dispensing system, comprising:
   a pump unit having a pair of end blocks with a cylinder secured therebetween;
   a piston slidable in said cylinder between a retracted position and an extended position;
   the first of said end blocks having a liquid inlet and liquid outlet therein, communicating with the interior of the cylinder;

the second of said end blocks having a barrel extending axially into said cylinder;

said piston being hollow with a closed end and an open end and being telescopically slidable over said barrel;

a source of liquid beverage connected to said liquid inlet;

a source of pressurized gas connected to said pump unit;

said barrel having an axial bore through which pressurized gas enters the piston to drive the piston to the extended position;

said piston being circumferentially spaced from said barrel and the open end of the piston having a sliding seal against the barrel;

a seal fixed on the barrel and engaging the piston in axial spaced relation to the sliding seal and defining a cushion chamber therebetween;

valve means in said pump unit for controlling the flow of pressurized gas to drive said piston to the extended position, and for conducting gas into said cushion chamber to return the piston to the retracted position in a continuous cycle;

and actuating means coupled to said source of pressurized gas for initiating the cycle of piston motion.

3. A beverage dispensing system according to claim 2, and including a valve body mounted in said barrel and communicating with said axial bore, and a valve spool mounted in the valve body for axial slidable movement between a retracted position and an extended position, said spool having a gas conducting central bore with a flow restricting orifice therein.

4. A beverage dispensing system according to claim 3, wherein said valve body has an inlet for admitting pressurized gas to drive said valve spool to the extended position toward said axial bore, said spool having an enlarged head at the end adjacent the axial bore; said valve body having gas vent means open to the axial bore in the retracted position of the spool.

5. A beverage dispensing system according to claim 4, and including detent means for releasably holding said spool in retracted and extended positions.

6. A beverage dispensing system according to claim 4, and including a control valve mounted in said second end block, said control valve being coupled to said source of pressurized gas;

said actuating means being connected between said control valve and aid inlet.

7. A beverage dispensing system according to claim 6, wherein said control valve conducts starting pressure to said inlet in a starting position of the valve, and conducts sustaining pressure to the inlet in an operating position;

said control valve being actuated by movement of said piston.

8. A beverage dispensing system according to claim 7, and including a further control valve mounted in said second end block and actuated by movement of the piston;

and a cycle counter connected through said further control valve to said source of pressurized gas.

9. A beverage dispensing system according to claim 2, wherein said source of liquid comprises a reservoir having a lower end with a supply outlet therein, a supply line connecting said supply outlet to said liquid inlet, a float valve in said reservoir with means for closing the supply outlet when the liquid is below a predetermined level, and a restricted bleed port from said reservoir to the supply outlet bypassing the float valve;

a shut off valve coupled between said pump unit and said pressurized gas source;

said supply outlet having a vacuum bleed connection; and said shut off valve being vacuum operated and connected to said bleed connection.

* * * * *